United States Patent
Gottmann et al.

(10) Patent No.: US 7,968,245 B2
(45) Date of Patent: Jun. 28, 2011

(54) HIGH UTILIZATION STACK

(75) Inventors: Matthias Gottmann, Sunnyvale, CA (US); Tad Armstrong, Burlingame, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1311 days.

(21) Appl. No.: 11/526,029

(22) Filed: Sep. 25, 2006

(65) Prior Publication Data
US 2008/0076006 A1    Mar. 27, 2008

(51) Int. Cl.
- H01M 8/10 (2006.01)
- H01M 4/02 (2006.01)
- H01M 8/18 (2006.01)
- H01M 8/24 (2006.01)

(52) U.S. Cl. ......... 429/479; 429/523; 429/465; 429/452

(58) Field of Classification Search ............. None
See application file for complete search history.

(56) References Cited

U.S. PATENT DOCUMENTS

| | | | |
|---|---|---|---|
| 4,426,269 A | 1/1984 | Brown et al. | |
| 4,575,407 A | 3/1986 | Diller | |
| 4,792,502 A | 12/1988 | Trocciola et al. | |
| 4,804,592 A | 2/1989 | Vanderborgh et al. | |
| 4,847,173 A | 7/1989 | Mitsunnaga et al. | |
| 4,898,792 A | 2/1990 | Singh et al. | |
| 4,925,745 A | 5/1990 | Remick et al | |
| 4,983,471 A | 1/1991 | Reichner et al. | |
| 5,047,299 A | 9/1991 | Shockling | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |
| 5,498,487 A | 3/1996 | Ruka et al. | |
| 5,501,914 A | 3/1996 | Satake et al. | |
| 5,505,824 A | 4/1996 | McElroy | |
| 5,527,631 A | 6/1996 | Singh et al. | |
| 5,573,867 A | 11/1996 | Zafred et al. | |
| 5,589,285 A | 12/1996 | Cable et al. | |
| 5,601,937 A | 2/1997 | Isenberg | |
| 5,686,196 A | 11/1997 | Singh et al. | |

(Continued)

FOREIGN PATENT DOCUMENTS

WO    WO 2004/093214    10/2004

OTHER PUBLICATIONS

J.M. Sedlak, J. F. Austin and A. B. LaConti, "Hydrogen Recovery and Purification Using the Solid Polymer Electrolyte Electrolysis Cell," Int. J. Hydrogen Energy, vol. 6, pp. 45-51. (1981).

(Continued)

Primary Examiner — Barbara L. Gilliam
Assistant Examiner — Angela J. Martin
(74) Attorney, Agent, or Firm — The Marbury Law Group, PLLC

(57) ABSTRACT

A solid oxide fuel cell (SOFC) includes a cathode electrode, a solid oxide electrolyte, and an anode electrode. The anode electrode includes a first portion made of a first anode material and a second portion made of a second anode material. The first anode material is a higher performance, lower oxidation resistant material than the second anode material.

9 Claims, 5 Drawing Sheets

U.S. PATENT DOCUMENTS

| | | | |
|---|---|---|---|
| 5,688,609 | A | 11/1997 | Rostrup-Nielsen et al. |
| 5,733,675 | A | 3/1998 | Dederer et al. |
| 5,741,605 | A | 4/1998 | Gillett et al. |
| 5,922,488 | A | 7/1999 | Marucchi-Soos et al. |
| 5,955,039 | A | 9/1999 | Dowdy |
| 6,013,385 | A | 1/2000 | DuBose |
| 6,083,636 | A * | 7/2000 | Hsu ................................ 429/13 |
| 6,106,964 | A | 8/2000 | Voss et al. |
| 6,238,816 | B1 | 5/2001 | Cable et al. |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,436,562 | B1 | 8/2002 | DuBose |
| 6,451,466 | B1 | 9/2002 | Grasso et al. |
| 6,489,050 | B1 | 12/2002 | Ruhl et al. |
| 6,562,496 | B2 | 5/2003 | Faville et al. |
| 6,623,880 | B1 | 9/2003 | Geisbrecht et al. |
| 6,623,881 | B2 * | 9/2003 | Badding et al. .................. 429/30 |
| 6,677,070 | B2 | 1/2004 | Kearl |
| 6,821,663 | B2 | 11/2004 | McElroy et al. |
| 6,924,053 | B2 | 8/2005 | McElroy |
| 7,255,956 | B2 | 8/2007 | McElroy |
| 2001/0049035 | A1 | 12/2001 | Haltiner, Jr. et al. |
| 2002/0028362 | A1 | 3/2002 | Prediger et al. |
| 2002/0028367 | A1 | 3/2002 | Sammes et al. |
| 2002/0058175 | A1 | 5/2002 | Ruhl |
| 2002/0098406 | A1 | 7/2002 | Huang et al. |
| 2002/0106544 | A1 | 8/2002 | Noetzel et al. |
| 2003/0162067 | A1 | 8/2003 | McElroy |
| 2003/0196893 | A1 | 10/2003 | McElroy |
| 2004/0081859 | A1 | 4/2004 | McElroy et al. |
| 2004/0191597 | A1 | 9/2004 | McElroy |
| 2004/0191598 | A1 | 9/2004 | Gottmann et al. |
| 2004/0202914 | A1 | 10/2004 | Sridhar et al. |
| 2004/0224193 | A1 | 11/2004 | Mitlitsky et al. |
| 2004/0247970 | A1 | 12/2004 | Irvine et al. |
| 2005/0048334 | A1 | 3/2005 | Sridhar et al. |
| 2006/0040168 | A1 | 2/2006 | Sridhar |
| 2006/0166070 | A1 | 7/2006 | Hickey |
| 2006/0204827 | A1 | 9/2006 | Hickey et al. |
| 2007/0287048 | A1 | 12/2007 | Couse et al. |
| 2008/0248349 | A1 * | 10/2008 | McElroy et al. ................. 429/20 |

OTHER PUBLICATIONS

Low Cost, Compact Solid Oxide Fuel Cell Generator, http://www.odod.state.oh.us/tech/sbir/ Program_Services/ TechLink/ Tmi.PDF.

U.S. Appl. No. 11/907,204, filed Oct 10, 2007, Batawi.

U.S. Appl. No. 11/785,034, filed Apr. 13, 2007, Batawi.

EG&G Services, Parsons, Inc., SAIC, Fuel Cell Handbook, 5$^{th}$ edition. USDOE. Oct. 2000. 9-1-9-4; 9-12-9-14.

* cited by examiner

HIGH UTILIZATION STACK

BACKGROUND OF THE INVENTION

The present invention is generally directed to fuel cell components and a method of operating the same, and to solid oxide fuel cell anode materials in particular.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

The high temperature SOFCs are normally operated with significant excess fuel flow because (1) most present day anodes suffer partly irreversible damage when exposed to high oxygen partial pressure (very wet fuel); and (2) the electrochemical driving potential at high utilization (wet fuel) is relatively small and therefore current densities become small. Recently, anodes have been developed which are oxidation resistant. However, these oxidation resistant anodes usually display rather poor performance characteristics.

SUMMARY OF THE INVENTION

One aspect of the present invention provides a solid oxide fuel cell, comprising a cathode electrode, a solid oxide electrolyte, and an anode electrode. The anode electrode comprises a first portion comprising a first anode material and a second portion comprising a second anode material. The first anode material comprises a higher performance, lower oxidation resistant material than the second anode material.

Another aspect of the present invention provides a solid oxide fuel cell comprising a cathode electrode, a solid oxide electrolyte, and an anode electrode. The anode electrode comprises nickel and titanium oxide.

Another aspect of the present invention provides a fuel cell system, comprising a first fuel cell stack comprising a plurality of fuel cells of a first type and a second fuel cell stack comprising a plurality of fuel cells of a second type. The second stack is arranged in a cascade configuration with the first fuel cell stack. The anode electrodes of the fuel cells of the first type comprise a first anode material. The anode electrodes of the fuel cells of the second type comprise a second anode material which is a lower performance, higher oxidation resistant material than the first anode material.

DETAILED DESCRIPTION OF THE EMBODIMENTS

The present inventors realized that to reduce or prevent the partly irreversible damage to anode electrodes exposed to high oxygen partial pressure, an oxidation-resistant anode material can be used in conjunction with a conventional, less oxidation-resistant anode material to improve fuel cell performance at high fuel utilization. For example, the anode can be composed of multiple sections. In the area of fresh fuel, such as near the fuel inlet, a conventional anode material is utilized. Near the trailing edge of the cell, such as near the fuel outlet, an oxidation-resistant anode material is applied. Thereby, the penalty of the poor performing oxidation-resistant anode material can be minimized, but high fuel utilization is possible. In another example, the anode is composed of a mixed composition of the higher oxidation resistant material and the higher performance, lower oxidation-resistant material. This composition is a ceramic in the oxidized state, and is a cermet comprising a metal phase of nickel and at least one of Fe or Co, and a ceramic phase comprising $TiO_2$ in the reduced state. Through reoxidation, the nickel forms insulating NiO in the oxidized state, while the titanium-based phase provides electrical conductivity, thus preserving performance while minimizing anode damage due to high fuel utilization. The fuel cells can be built in a cascaded configuration where the depleted fuel of one cell is routed to another cell. Two or more levels of cascades can be utilized. If the downstream cells are built with oxidation-resistant anodes, maximum achievable fuel utilization can be increased.

Figure 1A:
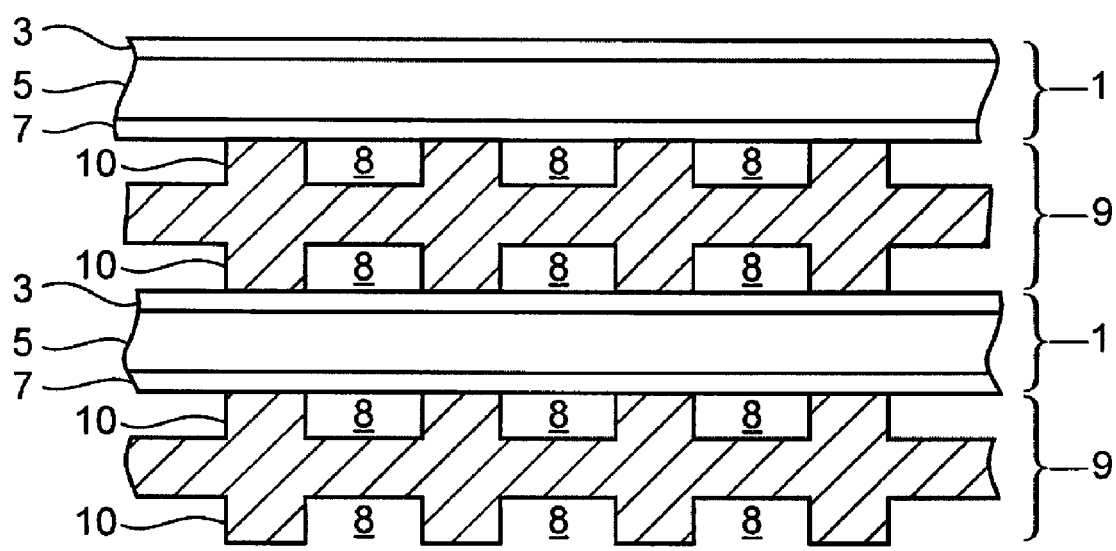
FIG. 1A illustrates a side cross-sectional view of a SOFC stack.
Figure 1B:
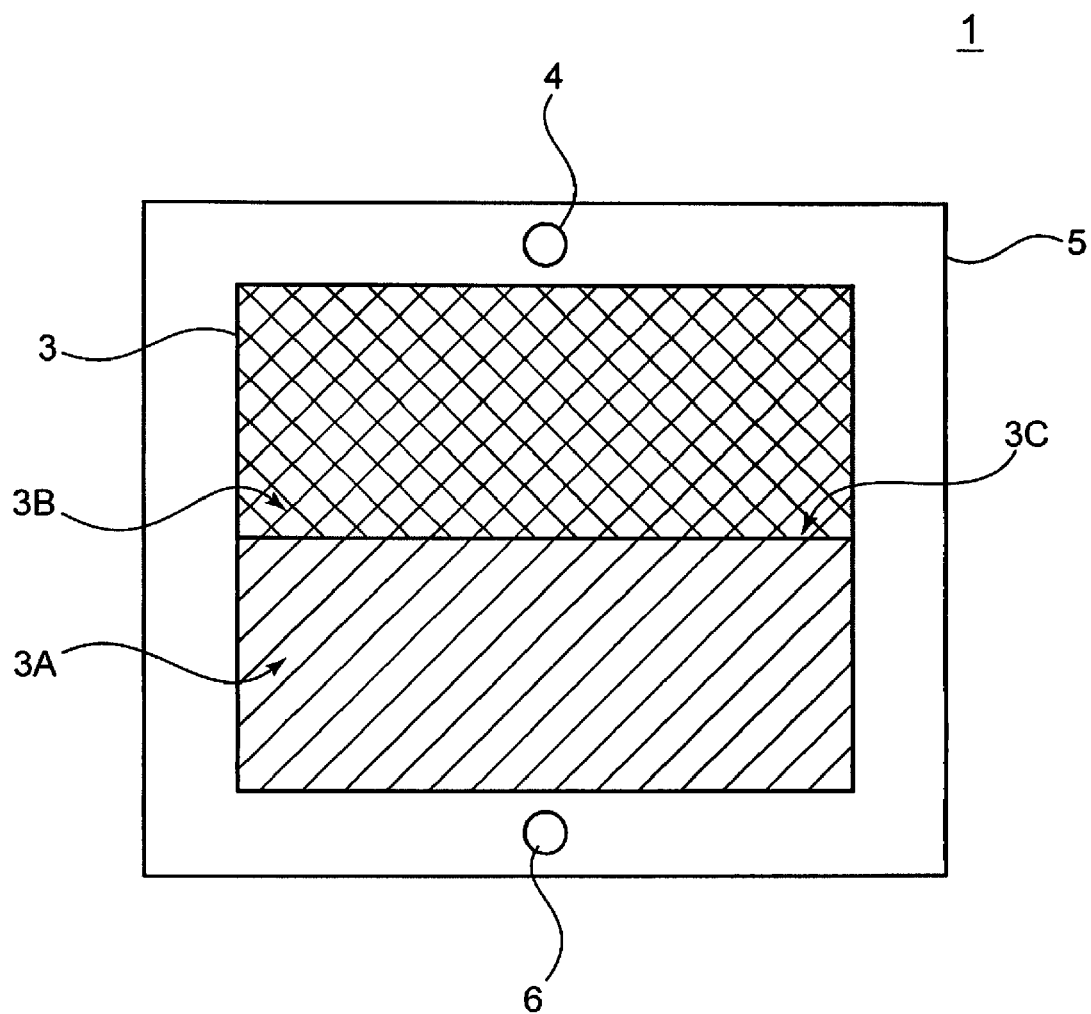
FIG. 1B illustrates a top view of a SOFC of a first embodiment.

FIG. 1A illustrates a SOFC stack of the first embodiment, in which each SOFC 1 comprises a cathode electrode 7, a solid oxide electrolyte 5, and an anode electrode 3. The gas flow separator 9 (referred to as a gas flow separator plate in a planar stack), containing gas flow passages or channels 8 between ribs 10, separates the individual cells in the stack. The anode electrode 3 comprises two portions of anode material, as illustrated by a top view of the anode electrode 3 in FIG. 1B. The first portion 3A comprises a first anode material and the second portion 3B comprises a second anode material. The first anode material comprises a higher performance, lower oxidation resistant material than the second anode material. The fuel stream enters the SOFC 1 at fuel inlet 6 and exits at fuel outlet 4. In one configuration of the first embodiment, the first anode material in portion 3A is located adjacent to fuel inlet 6 and the second anode material in portion 3B is located adjacent to fuel outlet 4. The first anode material 3A may comprise a nickel cermet material. The second anode material 3B may comprise a titanium containing rutile or pyrochlore material. For example, the first anode material 3A may comprise a nickel-stabilized zirconia cermet, such as a nickel-yttria or scandia stabilized zirconia. The second anode material 3B may comprise materials such as $Nb_{0.7}Ti_{0.3}O_2$ or $Gd_2Ti_{0.6}Mo_{1.4}O_7$. While the boundary line 3C between the portions 3A, 3B is shown as a straight line in FIG. 1B, this boundary 3C may have other shapes, such as a curved line (convex toward inlet 4 or outlet 6), a jagged line, a battlement shaped line, or other zigzag or non-straight shaped line.

Figure 1C:
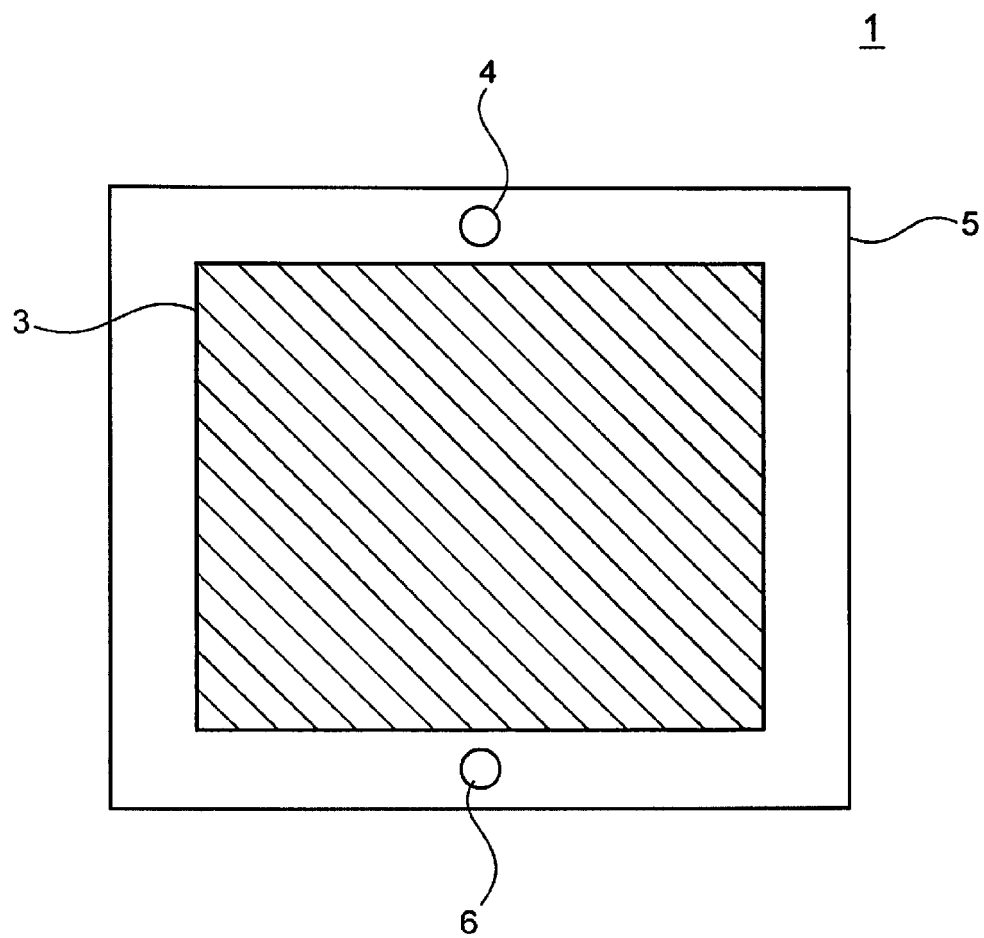
FIG. 1C illustrates a top view of a SOFC of a second embodiment.

In a second embodiment shown in FIG. 1C, the SOFC 1 comprises a solid oxide electrolyte 5, and an anode electrode 3, wherein the anode electrode 3 comprises a mixed composition, such as nickel and titanium oxide (the cathode electrode is not shown). The anode is manufactured as a ceramic anode and is reduced to a cermet having metal (i.e. nickel, etc) and ceramic (i.e. titanium oxide) phases by the end user, who can subsequently oxidize and reduce the anode composition during the use of the SOFC. If the end user oxidizes the composition, such as by using very wet fuel, then the nickel-containing phase becomes an insulating nickel oxide, while the titanium-based conductive ceramic phase provides electrical conductivity to preserve the performance of the fuel cell. Thus, in an oxidized state, the anode electrode 3 comprises a nickel titanium oxide composition doped with at least one electrical conductivity-enhancing dopant. As one example, in an oxidized state, the anode electrode 3 may comprise $TiNi_{(1-x)}(Co, Fe)_xO_3$, where $0.2 \leq x \leq 0.5$. The Co and/or Fe acts as the conductivity enhancing dopant. If the end user reduces the composition, the anode electrode 3 will comprise a cermet having a ceramic phase comprising titanium oxide, and a metal phase comprising nickel and at least one of Co or Fe. Due to the reducing atmosphere, $TiNiO_3$ reduces to nickel metal and titanium oxide. Upon reoxidation, $TiNiO_3$ forms, which if doped with Co and/or Fe provides electrical conductivity.

Fuel cell stacks are frequently built from a multiplicity of SOFC's 1 in the form of planar elements, tubes, or other geometries. Fuel and air has to be provided to the electrochemically active surface, which can be large. One component of a fuel cell stack is the so called gas flow separator (referred to as a gas flow separator plate in a planar stack) 9 that separates the individual cells in the stack. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. The separator 9 shown in FIG. 1A contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material. FIG. 1A shows that the lower SOFC 1 is located between two gas separator plates 9.

Each SOFC contains a hydrocarbon fuel inlet 6. In stacks which are internally manifolded for fuel, the fuel inlet 6 comprises a fuel inlet riser opening. A fuel inlet riser is a series of connected openings through the gas separator plates and/or through one or more layers of the SOFC, such as the anode, cathode, and/or electrolyte. The SOFC also contains a corresponding fuel outlet 4.

Figure 2:
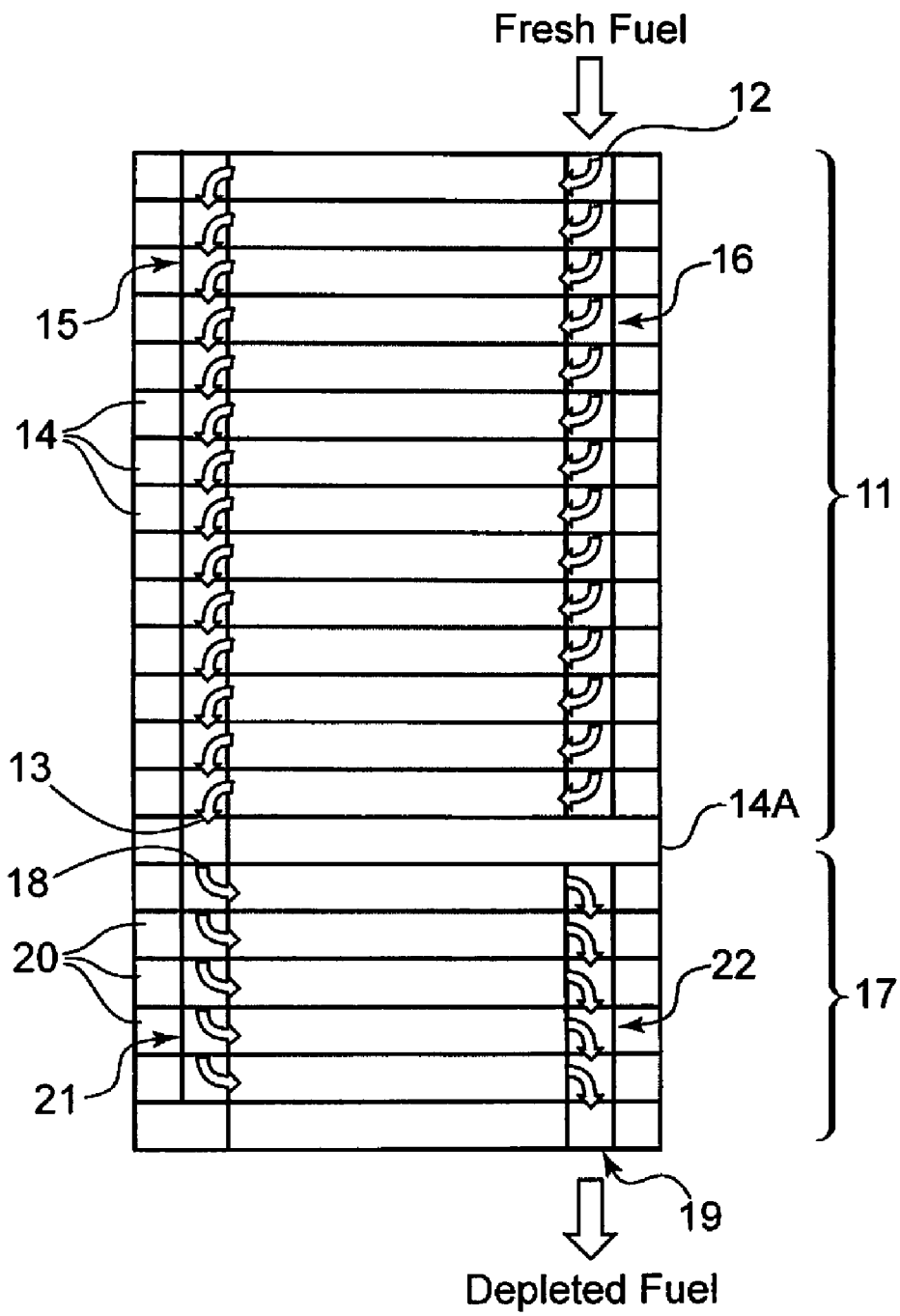
FIGS. 2 and 3 are schematic side cross-sectional views of the cascaded fuel cell systems of alternative embodiments of the present invention.

In a third embodiment, the solid oxide fuel cell system comprises a first fuel cell stack comprising a plurality of fuel cells of a first type and a second fuel cell stack comprising a plurality of fuel cells of a second type. Preferably, the fuel cells comprise SOFCs. FIG. 2 illustrates a fuel cell system 2 which includes a first fuel cell stack 11, and a second fuel cell stack 17 arranged in a cascade configuration with the first fuel cell stack 11. The incoming fuel, such as a hydrocarbon fuel, flows downward on the right hand side of the first stack 11. The depleted fuel (i.e. the fuel exhaust) stream is removed downward through the fuel exhaust riser 15 and into the fuel inlet of the second fuel cell stack 17. The fuel inlet riser 16 is blocked off at the interface between the first stack 11 and the second stack 17. Therefore, the depleted fuel of the first stack 11 is fed from the fuel exhaust riser 15 of the first stack 11 into the fuel inlet riser 21 of the second stack 17 containing a plurality of fuel cells. Thus, the second stack 17 acts as a scavenger stack, operating on fuel left behind from the first stack 11.

The fuel cells 14 of the first stack 11 are a different type of fuel cells than the fuel cells 20 of the second stack 17. The fuel cells 14, 20 each have a cathode electrode 7, a solid oxide electrolyte 5, and an anode electrode 3. The anode electrodes of the first stack 11 comprises a higher performance, lower oxidation resistant material than the anode electrode material of the second stack 17. The anode material of the first stack 11 may comprise a nickel cermet material. The anode material of the second stack 17 may comprise titanium containing rutile or pyrocholore material. For example, the anode material of the first stack 11 comprises the nickel-stabilized zirconia cermet described above and the anode material of the second stack 17 comprises materials such as $Nb_{0.7}Ti_{0.3}O_2$ or $Gd_2Ti_{0.6}Mo_{1.4}O_7$.

It should be noted that the fuel cells 14, 20 do not necessarily have to be internally manifolded and may comprise externally manifolded cells. Furthermore, while FIG. 2 shows that the stacks 11, 17 comprise a plurality of planar or plate shaped fuel cells 14, 20, the fuel cells may have other configurations, such as tubular. Still further, while vertically oriented stacks are shown in FIG. 2, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks.

The term "fuel cell stack" as used herein, also includes a part of the distinct electrical entity. For example, the stacks 11, 17 shown in FIG. 2 may share the same end plates, with one end plate being located below stack 11 and the second end plate being located above stack 17. In this case, the stacks 11, 17 jointly comprise a distinct electrical entity. In this case, the electrical power output from both stacks 11, 17 cannot be separately controlled.

As shown in FIG. 2, the first fuel cell stack 11 includes a fuel inlet port 12 and fuel exhaust port 13. The second fuel cell stack 17 includes a fuel exhaust port 19 and a fuel inlet port 18 which is fluidly connected to the fuel exhaust port 13 of the first stack 11. The term "fluidly connected," as used herein, means that the fuel exhaust stream from the first stack can travel from the fuel exhaust port 12 into the fuel inlet port 18 either directly or indirectly through a connecting conduit.

For example, as shown in FIG. 2, the fuel exhaust riser 15 of the first stack 11 is aligned to the fuel inlet riser 21 of the second stack 17. In this case, the fuel exhaust port 13 and fuel inlet port 18 comprise adjacent contacting portions of the fuel exhaust riser 15 and the fuel inlet riser 21, respectively. In other words, the fuel cells 14, 20 are simply stacked over each other and the risers 15 and 21 constitute a single, continuous passage through the fuel cells of the stacks 11 and 17, respectively. One of the fuel cells, designated as 14A, contains a blocked fuel inlet riser channel 16 by lacking a fuel inlet riser opening in its supporting layer, such as in an electrolyte, in an electrode and/or in a gas separator plate. This fuel cell 14A acts as a partition between the first stack 11 and the second stack 17. Thus, the fuel inlet riser 16 of the first stack 11 is connected to the fuel inlet port 12 of the first stack 11. The fuel exhaust riser 15 of the first stack 11 is connected to the fuel inlet riser 21 of the second stack 17. The fuel exhaust riser 22 of the second stack 17 is connected to the fuel exhaust port 19 of the second stack 17. In the configuration of the embodiment of FIG. 2, there is only one inlet port 12 and one exhaust port 19 which are connected to outside components for both stacks 11, 17. This reduces the complexity of the system.

In the configuration described above, the first stack 11 and the second stack 17 comprise a common electrical entity and share the same set of end plates. In other words, all fuel cells 14, 14A, and 20 of both stacks 11, 17 are connected in series with each other, with one end plate located in electrical contact with the bottom fuel cell of the first stack while the second end plate is located in electrical contact with the top fuel cell of the second stack, and both end plates are connected to a power conditioning system.

While two stacks 11, 17 are illustrated in FIG. 2, three or more stacks, such as three to ten stacks may be provided in the cascade configuration. In this configuration, each subsequent stack uses the fuel exhaust stream from the previous stack as a fuel source.

Figure 3:
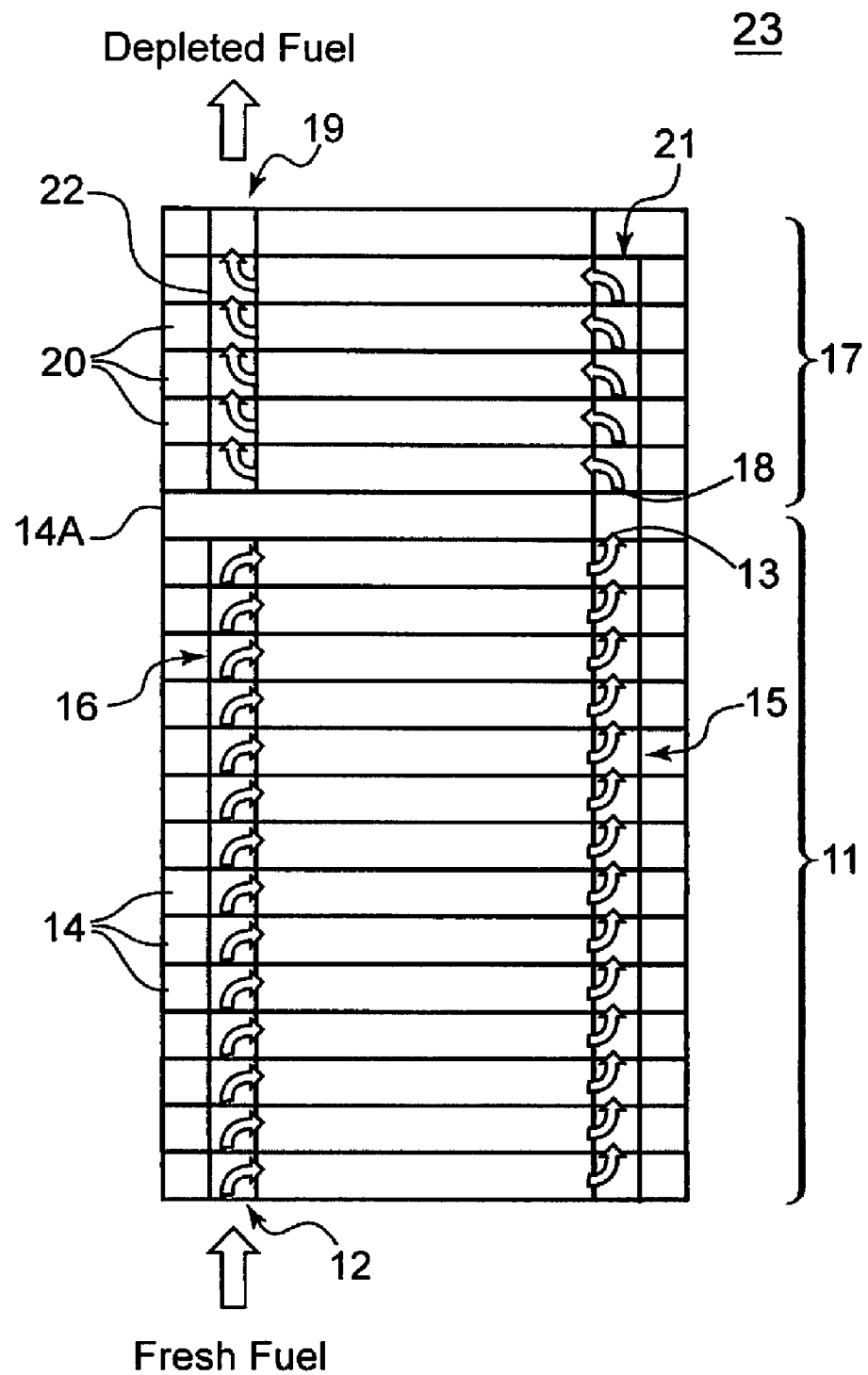

FIG. 3 illustrates a fuel cell system 23 according to a fourth embodiment of the invention. The system 23 is the same as the system 2 of the third embodiment, except that the first stack 11 is located below the second stack 17. In other words, the system 23 comprises a vertical system which is turned upside down compared to the system 2 of the third embodiment. Preferably, the fuel inlet port 12 of the first stack 11 of the system 23 is located in a lower portion of the first stack 11. The systems 2 and 23 may be thermally integrated with a hydrocarbon fuel reformer, as described in U.S. application Ser. No. 11/274,928, filed on Nov. 16, 2005, incorporated herein by reference in its entirety.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A fuel cell system, comprising:
a first fuel cell stack comprising a plurality of fuel cells of a first type;
a second fuel cell stack comprising a plurality of fuel cells of a second type;
wherein:
the fuel cells of the first type and the fuel cells of the second type comprise solid oxide fuel cells;
the second stack is arranged in a cascade configuration with the first fuel cell stack;
the anode electrodes of the fuel cells of the first type comprise a nickel cermet material; and
the anode electrodes of the fuel cells of the second type comprise a titanium containing rutile or pyrochlore material which is a lower performance, higher oxidation resistant material than the nickel cermet material.

2. The system of claim 1, wherein:
the first fuel cell stack comprises a fuel inlet port and a fuel exhaust port; and
the second fuel cell stack comprises a fuel exhaust port and a fuel inlet port which is fluidly connected to the fuel exhaust port of the first stack.

3. The system of claim 2, wherein:
the first stack and the second stack each comprise a fuel inlet riser and a fuel exhaust riser;
the fuel inlet riser of the first stack is connected to the fuel inlet port of the first stack;
the fuel exhaust riser of the first stack is aligned to the fuel inlet riser of the second stack, such that the fuel exhaust port of the first stack and the fuel inlet port of the second stack comprise adjacent contacting portions of the fuel exhaust riser of the first stack and of the fuel inlet riser of the second stack, respectively.

4. The system of claim 1, wherein the anode electrodes of the fuel cells of the first type comprise a nickel-stabilized zirconia material and the anode electrodes of the fuel cells of the second type comprise $Nb_{0.7}Ti_{0.3}O_2$.

5. The system of claim 1, wherein the anode electrodes of the fuel cells of the first type comprise a nickel-stabilized zirconia material and the anode electrodes of the fuel cells of the second type comprise $Gd_2Ti_{0.6}Mo_{1.4}O_7$.

6. A fuel cell system, comprising:
a first fuel cell stack comprising a plurality of fuel cells of a first type;
a second fuel cell stack comprising a plurality of fuel cells of a second type;
wherein:
the fuel cells of the first type and the fuel cells of the second type comprise solid oxide fuel cells;
the second stack is arranged in a cascade configuration with the first fuel cell stack;
the anode electrodes of the fuel cells of the first type comprise a first anode material; and
the anode electrodes of the fuel cells of the second type comprise a second anode material which is a lower performance, higher oxidation resistant material than the first anode material.

7. The system of claim 6, wherein:
the first fuel cell stack comprises a fuel inlet port and a fuel exhaust port; and
the second fuel cell stack comprises a fuel exhaust port and a fuel inlet port which is fluidly connected to the fuel exhaust port of the first stack.

8. The system of claim 7, wherein:
the first stack and the second stack each comprise a fuel inlet riser and a fuel exhaust riser;
the fuel inlet riser of the first stack is connected to the fuel inlet port of the first stack;
the fuel exhaust riser of the first stack is aligned to the fuel inlet riser of the second stack, such that the fuel exhaust port of the first stack and the fuel inlet port of the second stack comprise adjacent contacting portions of the fuel exhaust riser of the first stack and of the fuel inlet riser of the second stack, respectively.

9. The system of claim 6, wherein the anode electrodes of the fuel cells of the first type comprise a nickel cermet material and the anode electrodes of the fuel cells of the second type comprise a titanium containing pyrochlore material.

* * * * *